United States Patent
Wang et al.

(10) Patent No.: US 10,468,757 B2
(45) Date of Patent: Nov. 5, 2019

(54) WEARABLE DEVICE AND ANTENNA THEREOF

(71) Applicant: Huawei Technologies Co., Ltd., Shenzhen (CN)

(72) Inventors: Wen Wang, Shenzhen (CN); Shuhui Sun, Shenzhen (CN); Qing Liu, Shenzhen (CN); Lina Chen, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/779,407

(22) PCT Filed: Nov. 27, 2015

(86) PCT No.: PCT/CN2015/095745
§ 371 (c)(1),
(2) Date: May 25, 2018

(87) PCT Pub. No.: WO2017/088164
PCT Pub. Date: Jun. 1, 2017

(65) Prior Publication Data
US 2018/0309194 A1 Oct. 25, 2018

(51) Int. Cl.
*H01Q 1/24* (2006.01)
*H01Q 1/27* (2006.01)
(Continued)

(52) U.S. Cl.
CPC .............. *H01Q 1/273* (2013.01); *H01Q 1/50* (2013.01); *H01Q 9/0414* (2013.01);
(Continued)

(58) Field of Classification Search
CPC ............ H01Q 1/24; H01Q 1/50; H01Q 13/10; H01Q 1/385
(Continued)

(56) References Cited

U.S. PATENT DOCUMENTS

| | | | | |
|---|---|---|---|---|
| 5,768,217 | A * | 6/1998 | Sonoda | G04B 47/025 368/10 |
| 8,773,847 | B2 * | 7/2014 | Byun | H04B 1/385 361/679.03 |

(Continued)

FOREIGN PATENT DOCUMENTS

| | | |
|---|---|---|
| CN | 104466363 A | 3/2015 |
| CN | 104617376 A | 5/2015 |

(Continued)

OTHER PUBLICATIONS

Machine Translation and Abstract of Japanese Publication No. JPH09247006, Sep. 19, 1997, 7 pages.
(Continued)

*Primary Examiner* — Huedung X Mancuso
(74) *Attorney, Agent, or Firm* — Conley Rose, P.C.

(57) ABSTRACT

An antenna of a wearable device includes a metal bottom housing of the wearable device, a printed circuit board, a metal middle housing that encircles the printed circuit board, and a communications circuit set on the printed circuit board. A slot exists between the metal middle housing and the metal bottom housing. The metal middle housing is connected to the metal bottom housing using a second connecting wire. The metal middle housing and the printed circuit board jointly serve as a ground plate. An antenna feed line is used to connect the metal bottom housing and the communications circuit module. The metal bottom housing serves as an antenna radiation body.

11 Claims, 1 Drawing Sheet

(51) Int. Cl.
*H01Q 1/50* (2006.01)
*H04B 1/3827* (2015.01)
*H01Q 9/04* (2006.01)
*H01Q 13/10* (2006.01)
*H01Q 1/22* (2006.01)
*H01Q 1/38* (2006.01)
*H01Q 1/44* (2006.01)

(52) U.S. Cl.
CPC ............ *H01Q 13/10* (2013.01); *H04B 1/385* (2013.01); *H01Q 1/2291* (2013.01); *H01Q 1/38* (2013.01); *H01Q 1/44* (2013.01)

(58) Field of Classification Search
USPC ........................................................ 343/702
See application file for complete search history.

(56) References Cited

U.S. PATENT DOCUMENTS

| 9,130,272 | B2* | 9/2015 | Fujisawa | G04G 5/002 |
| 9,196,952 | B2* | 11/2015 | Tran | H01Q 1/243 |
| 9,601,824 | B2* | 3/2017 | Apaydin | H01Q 5/328 |
| 2007/0091004 | A1 | 4/2007 | Puuri | |
| 2012/0299785 | A1 | 11/2012 | Bevelacqua | |
| 2015/0070840 | A1 | 3/2015 | Rappoport et al. | |

FOREIGN PATENT DOCUMENTS

| JP | H09247006 A | 9/1997 |
| TW | 201251202 A | 12/2012 |

OTHER PUBLICATIONS

Foreign Communication From a Counterpart Application, Chinese Application No. 201580070736.9, Chinese Office Action dated Mar. 29, 2019, 6 pages.
Machine Translation and Abstract of Chinese Publication No. CN104466363, Mar. 25, 2015, 10 pages.
Machine Translation and Abstract of Chinese Publication No. CN104617376, May 13, 2015, 6 pages.
Foreign Communication From a Counterpart Application, PCT Application No. PCT/CN2015/095745, English Translation of International Search Report dated Aug. 31, 2016, 2 pages.
Foreign Communication From a Counterpart Application, PCT Application No. PCT/CN2015/095745, English Translation of Written Opinion dated Aug. 31, 2016, 3 pages.

* cited by examiner

WEARABLE DEVICE AND ANTENNA THEREOF

CROSS-REFERENCE TO RELATED APPLICATION

This application is a U.S. National Stage of International Patent Application No. PCT/CN2015/095745 filed on Nov. 27, 2015, which is hereby incorporated by reference in its entirety.

TECHNICAL FIELD

Embodiments of the present disclosure relate to the field of communications technologies, and in particular, to a wearable device and an antenna thereof.

BACKGROUND

Wearable devices are increasingly popular because they can better meet people's communication needs. This reflects a development trend that future communications devices are becoming smaller and more portable. Currently, major communications device manufacturers have released their own smartwatches, and there is fierce competition in this field.

Compared with common watches, smartwatches integrate a communication function and therefore need a built-in antenna to transmit or receive electromagnetic signals. Currently, an antenna is usually disposed around a printed circuit board in a form of a monopole, an inverted-F antenna (IFA), or the like. To maintain good transmit efficiency, the antenna needs headroom. There is a specific height from the disposed antenna to the printed circuit board.

However, the headroom required by the antenna increases a size of a wearable device (such as a smartwatch). This is unfavorable for miniaturization of the wearable device. In addition, when an antenna such as a monopole or an IFA approaches a human body, a relatively large amount of electromagnetic waves emitted by the antenna is absorbed by the human body. This causes performance of the antenna to greatly deteriorate and is harmful for human health. More functions are integrated into a wearable device, and communication functions need to integrate functions of BLUETOOTH, a wireless local area network, a communications system, and a global positioning system. Correspondingly, different antennas are required to transmit or receive signals of these functions. However, a wearable device is usually small and unable to accommodate these antennas.

SUMMARY

Embodiments of the present disclosure provide a wearable device and an antenna thereof in order to improve a radiation effect of the antenna of the wearable device and facilitate miniaturization development of the antenna of the wearable device.

A first aspect provides an antenna of a wearable device, where the antenna includes a printed circuit board and a metal bottom housing, the metal bottom housing serves as an antenna radiation body, the printed circuit board serves as a ground plate, and an antenna feed line is used to connect the metal bottom housing and a communications circuit module on the printed circuit board, and the antenna further includes a metal middle housing that encircles the printed circuit board, the metal middle housing is electrically connected to the printed circuit board, and the metal middle housing and the printed circuit board jointly serve as a ground plate, and the metal middle housing is connected to the metal bottom housing using a second connecting wire, a slot exists between the metal middle housing and the metal bottom housing, and a slot antenna is formed by the metal middle housing, the metal bottom housing, and the slot between the metal middle housing and the metal bottom housing.

With reference to the first aspect, in a first possible implementation, the metal middle housing is electrically connected to the printed circuit board using at least one first connecting wire.

With reference to the first possible implementation of the first aspect, in a second possible implementation, the printed circuit board is a circular plate.

With reference to the first aspect, in a third possible implementation, an insulation plate is disposed inside the slot.

A second aspect provides a wearable device, where the wearable device includes a metal middle housing, a display disposed on the top of the metal middle housing, a printed circuit board disposed in the metal middle housing, and a metal bottom housing stacked with the metal middle housing, where the metal bottom housing serves as an antenna radiation body, the printed circuit board serves as a ground plate, and an antenna feed line is used to connect the metal bottom housing and a communications circuit module on the printed circuit board, and the metal middle housing is electrically connected to the printed circuit board, and the metal middle housing and the printed circuit board jointly serve as a ground plate, and the metal middle housing is connected to the metal bottom housing using a second connecting wire, and a slot antenna is formed by the metal middle housing, the metal bottom housing, and a slot between the metal middle housing and the metal bottom housing.

With reference to the second aspect, in a first possible implementation, the metal middle housing is electrically connected to the printed circuit board using at least one first connecting wire.

With reference to the first possible implementation of the second aspect, in a second possible implementation, the printed circuit board is a circular plate.

With reference to the second aspect, in a third possible implementation, an insulation plate is disposed inside the slot.

According to the antenna of a wearable device provided in the first aspect and the wearable device provided in the second aspect, using a metal bottom housing as an antenna radiation body and using a printed circuit board as a ground plate, the antenna provided in the embodiments of the present disclosure implements coverage of a full spectrum of Long Term Evolution (LTE) and frequency bands of BLUETOOTH, a wireless local area network, a communications system, and a global positioning system, without enlarging a size of the wearable device, and one antenna meets multiple communication functions. With a feature that an arm can improve antenna impedance, the antenna provided in the embodiments of the present disclosure reduces impact of the arm on the antenna of the wearable device. Further, when the wearable device is worn, an arm touches the metal bottom housing that serves as the radiation body. On one hand, the arm absorbs radiation energy, and on the other hand, due to the absorption, antenna impedance is improved and converged to approximately 50 ohm. Because an improvement effect of the arm on antenna impedance is greater than absorption, antenna radiation efficiency when the wearable device is on the arm is better than antenna radiation efficiency when the wearable device is in free space. Therefore, this improves an entire radiation effect of the antenna of the wearable device.

REFERENCE SIGNS

1—Metal middle housing;
2—First connecting wire;
3—Metal bottom housing;
4—Battery;
5—Slot;
6—Second connecting wire;
7—Printed circuit board;
8—Display;
9—Antenna feed line;
10—Gap; and
11—Insulation plate.

DESCRIPTION OF EMBODIMENTS

The following describes specific embodiments of embodiments of the present disclosure in detail with reference to the accompanying drawings. It should be understood that the specific embodiments described herein are merely used to explain the embodiments of the present disclosure but are not intended to limit the embodiments of the present disclosure.

Figure 1:
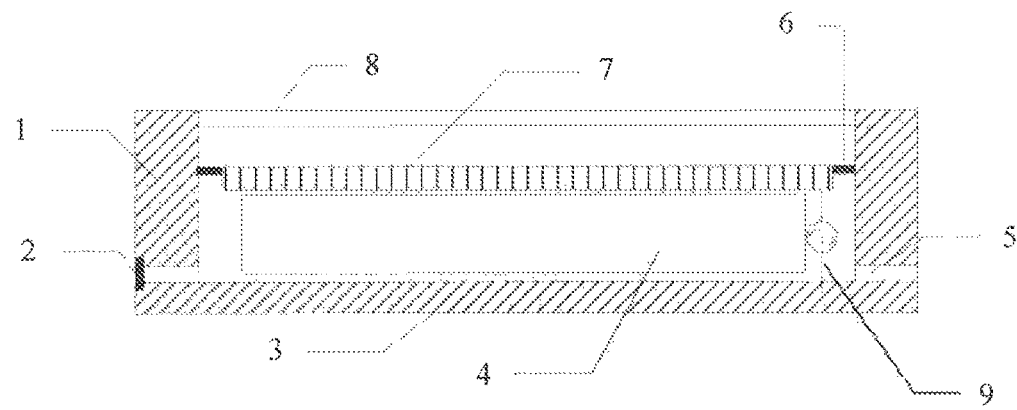
FIG. 1 is a schematic structural diagram of a wearable device according to an embodiment of the present disclosure.

As shown in FIG. 1, FIG. 1 shows a wearable device according to this embodiment. A structure of an antenna of the wearable device according to this embodiment can be learned from FIG. 1.

This embodiment of the present disclosure provides an antenna of a wearable device. The antenna includes a printed circuit board 7 and a metal bottom housing 3. The metal bottom housing 3 serves as an antenna radiation body, the printed circuit board 7 serves as a ground plate, and an antenna feed line 9 is used to connect the metal bottom housing 3 and a communications circuit module on the printed circuit board 7.

The antenna further includes a metal middle housing 1 that encircles the printed circuit board 7, the metal middle housing 1 is electrically connected to the printed circuit board 7, and the metal middle housing 1 and the printed circuit board 7 jointly serve as a ground plate.

The metal middle housing 1 is connected to the metal bottom housing 3 using a second connecting wire 6, a slot 5 exists between the metal middle housing 1 and the metal bottom housing 3, and a slot antenna is formed by the metal middle housing 1, the metal bottom housing 3, and the slot 5 between the metal middle housing 1 and the metal bottom housing 3.

In the foregoing embodiment, an antenna is formed using the metal bottom housing 3 as the antenna radiation body, using the printed circuit board 7 as the ground plate, and using the antenna feed line 9 to connect the metal bottom housing 3 and the printed circuit board 7. When the wearable device is worn, an arm touches the metal bottom housing 3 that serves as the radiation body. On one hand, the arm absorbs radiation energy, and on the other hand, due to the absorption, antenna impedance is improved and converged to approximately 50 ohm. Because an improvement effect of the arm on antenna impedance is greater than absorption, antenna radiation efficiency when the wearable device is on the arm is better than antenna radiation efficiency when the wearable device is in free space. Therefore, this improves an entire radiation effect of the antenna of the wearable device. In addition, in specific use, the slot antenna provided in this embodiment functions with a planar IFA (PIFA), thereby improving the entire radiation effect of the antenna of the wearable device.

To facilitate a relatively intuitive understanding on the radiation effect of the antenna of the wearable device provided in this embodiment of the present disclosure, Table 1 shows an experiment effect of implementing communication of the antenna of the wearable device provided in this embodiment

TABLE 1

| Frequency in megahertz (MHz) | Located on the arm | | Located in free space | | |
|---|---|---|---|---|---|
| | Efficiency in decibel (dB) | Efficiency (%) | Efficiency (dB) | Efficiency (%) | Difference (dB) |
| 790 | −13.56 | 4.40 | −16.54 | 2.22 | 2.98 |
| 820 | −12.77 | 5.29 | −15.48 | 2.83 | 2.71 |
| 850 | −12.47 | 5.66 | −14.65 | 3.43 | 2.18 |
| 880 | −12.18 | 6.05 | −13.63 | 4.34 | 1.45 |
| 910 | −12.27 | 5.93 | −13.23 | 4.75 | 0.96 |
| 940 | −12.20 | 6.02 | −12.80 | 5.24 | 0.60 |
| 960 | −12.16 | 6.08 | −12.70 | 5.37 | 0.54 |
| 1500 | −9.99 | 10.03 | −15.07 | 3.11 | 5.08 |
| 1530 | −9.76 | 10.58 | −14.73 | 3.36 | 4.98 |
| 1560 | −9.54 | 11.11 | −14.27 | 3.74 | 4.73 |
| 1575 | −9.36 | 11.60 | −14.00 | 3.98 | 4.64 |
| 1590 | −9.22 | 11.98 | −13.79 | 4.18 | 4.57 |
| 1600 | −9.28 | 11.79 | −13.74 | 4.22 | 4.46 |
| 1710 | −9.03 | 12.49 | −12.43 | 5.71 | 3.40 |
| 1740 | −9.27 | 11.84 | −12.21 | 6.01 | 2.95 |
| 1770 | −9.47 | 11.30 | −11.86 | 6.52 | 2.39 |
| 1800 | −9.36 | 11.60 | −11.10 | 7.75 | 1.75 |
| 1830 | −9.67 | 10.79 | −10.76 | 8.40 | 1.09 |
| 1860 | −9.99 | 10.02 | −10.39 | 9.15 | 0.40 |
| 1890 | −10.09 | 9.80 | −10.01 | 9.98 | −0.08 |
| 1920 | −10.30 | 9.34 | −9.87 | 10.30 | −0.43 |
| 1950 | −10.55 | 8.80 | −9.79 | 10.49 | −0.76 |
| 1980 | −10.65 | 8.62 | −9.63 | 10.90 | −1.02 |
| 2010 | −10.72 | 8.48 | −9.61 | 10.95 | −1.11 |
| 2040 | −10.76 | 8.39 | −9.75 | 10.58 | −1.01 |
| 2070 | −10.55 | 8.80 | −10.07 | 9.83 | −0.48 |
| 2100 | −10.33 | 9.26 | −10.45 | 9.02 | 0.12 |
| 2130 | −9.77 | 10.54 | −10.47 | 8.98 | 0.69 |
| 2160 | −9.57 | 11.04 | −10.74 | 8.43 | 1.17 |
| 2190 | −9.26 | 11.85 | −10.62 | 8.66 | 1.36 |
| 2220 | −9.16 | 12.14 | −10.55 | 8.81 | 1.39 |
| 2250 | −8.75 | 13.32 | −10.05 | 9.89 | 1.29 |
| 2280 | −8.72 | 13.44 | −9.90 | 10.23 | 1.19 |
| 2310 | −8.28 | 14.86 | −9.23 | 11.93 | 0.96 |
| 2340 | −8.22 | 15.08 | −8.87 | 12.97 | 0.65 |
| 2370 | −8.36 | 14.59 | −8.67 | 13.60 | 0.31 |
| 2400 | −8.53 | 14.02 | −8.54 | 14.01 | 0.00 |
| 2430 | −8.45 | 14.30 | −8.27 | 14.90 | −0.18 |
| 2460 | −8.35 | 14.62 | −8.04 | 15.72 | −0.31 |
| 2490 | −8.58 | 13.85 | −8.33 | 14.69 | −0.25 |
| 2520 | −8.74 | 13.35 | −8.84 | 13.05 | 0.10 |
| 2550 | −8.37 | 14.54 | −8.64 | 13.68 | 0.27 |
| 2580 | −8.62 | 13.74 | −9.08 | 12.37 | 0.45 |
| 2610 | −8.68 | 13.54 | −9.24 | 11.91 | 0.56 |
| 2640 | −8.83 | 13.09 | −9.37 | 11.56 | 0.54 |
| 2670 | −8.72 | 13.44 | −9.31 | 11.73 | 0.59 |
| 2700 | −9.25 | 11.88 | −9.80 | 10.48 | 0.54 |

It can be learned from the foregoing experiment result that, in intra-frequency communication, when the antenna of the wearable device provided in this embodiment is worn, a radiation effect of the antenna is effectively improved.

To facilitate understanding of a structure of the antenna provided in this embodiment of the present disclosure, the following provides detailed description of the structure of the antenna with reference to the accompanying drawings.

Further referring to FIG. 1, the antenna provided in this embodiment includes a printed circuit board 7 and a metal bottom housing 3. The metal bottom housing 3 serves as an antenna radiation body, the printed circuit board 7 serves as a ground plate, and an antenna feed line 9 is used to connect the metal bottom housing 3 and a communications circuit module on the printed circuit board 7. Further, the communications circuit module is a communication radio frequency circuit.

Figure 2:
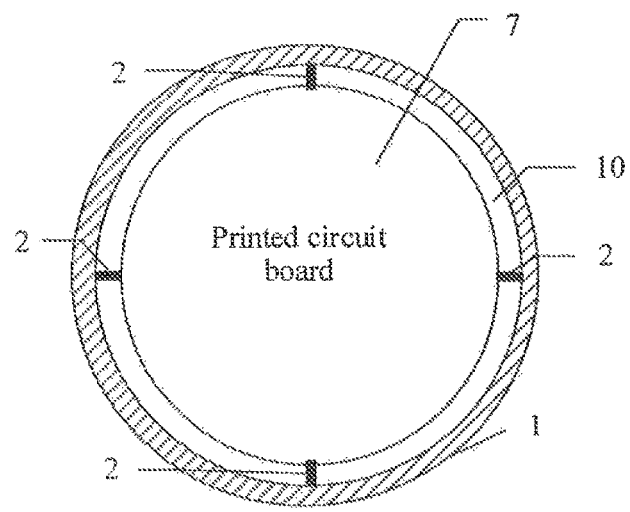
FIG. 2 is a top view of a connection between a printed circuit board and a metal middle housing of a wearable device according to an embodiment of the present disclosure.

In a specific arrangement, as shown in FIG. 2, a wearable device further has a metal middle housing 1 that encircles the printed circuit board 7. The metal middle housing 1 is electrically connected to the printed circuit board 7, and the metal middle housing 1 and the printed circuit board 7 jointly serve as a ground plate. In a specific arrangement, the metal middle housing 1 encircles the printed circuit board 7 one round, a gap 10 exists between the metal middle housing 1 and the printed circuit board 7, and multiple electrical connection points exist between the metal middle housing 1 and the printed circuit board 7. The metal middle housing 1 may be connected to the printed circuit board 7 using one connection point, multiple connection points, or all of the connection points. Herein, no limitation is imposed thereto. In addition, at the electrical connection points, the metal middle housing 1 is electrically connected to the printed circuit board 7 using at least one first connecting wire 2. In this case, the metal middle housing 1 serves as an extension part of the printed circuit board 7 and participates in ground current radiation.

In the foregoing embodiment, the printed circuit board 7 may be of different shapes, for example, a circle or a square. As shown in FIG. 2, in this embodiment, the printed circuit board 7 is a circular plate. In addition, in a specific arrangement, when multiple first connecting wires 2 are used to connect the printed circuit board 7 and the metal middle housing 1, the multiple first connecting wires 2 are arranged to encircle the printed circuit board 7.

In an antenna structure shown in FIG. 1, the antenna feed line 9 connects the printed circuit board 7 and the metal bottom housing 3 and feeds the metal bottom housing 3. The metal bottom housing 3 serves as an antenna radiation body. One or more electrical connection points exist between the metal middle housing 1 and the metal bottom housing 3 and serve as ground points of a PIFA in order to produce a low-frequency resonance and a high-frequency resonance. There may be one or more electrical connection points and one or more positions of the electrical connection points, and this is not limited herein.

Figure 3:
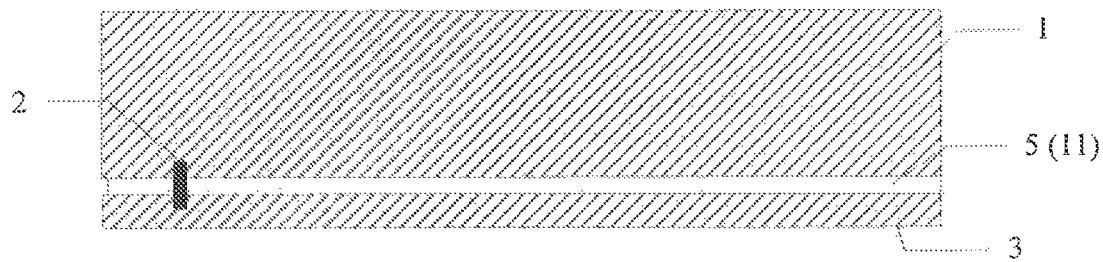
FIG. 3 is a schematic structural diagram of a slot antenna that is formed by a metal middle housing and a metal bottom housing according to an embodiment of the present disclosure.

As shown in FIG. 3, a slot 5 exists between the metal middle housing 1 and the metal bottom housing 3 provided in this embodiment. Further, a structure between the metal middle housing 1 and the metal bottom housing 3 includes the following. The metal middle housing 1 is connected to the metal bottom housing 3 using a second connecting wire 6, and the slot 5 exists between the metal middle housing 1 and the metal bottom housing 3. Therefore, a slot antenna is formed by the metal middle housing 1, the metal bottom housing 3, and the slot 5 between the metal middle housing 1 and the metal bottom housing 3 provided in this embodiment. In addition, the slot 5 serves as a radiation aperture. In a specific arrangement, an insulation plate 11 is disposed inside the slot 5. The insulation plate 11 is a non-metal insulation material such as a plastic pad, a rubber washer, or a ceramic wafer. In addition, a distance between a feed point and the ground point of the foregoing PIFA may be used for tuning impedance of the slot antenna. In specific use, the slot antenna provided in this embodiment functions with the PIFA in order to improve an entire radiation effect of the antenna of the wearable device.

Using the foregoing structure, the antenna provided in this embodiment of the present disclosure implements coverage of a full spectrum of LTE and frequency bands of a global positioning system, BLUETOOTH, and a wireless local area network, and one antenna meets multiple communication functions. In addition, with a feature that an arm can improve antenna impedance, an impact of the arm on the antenna of the wearable device is reduced, and a radiation effect of the antenna is improved.

Further referring to FIG. 1, this embodiment of the present disclosure further provides a wearable device. The wearable device includes a metal middle housing 1, a display 8 disposed on the top of the metal middle housing 1, a printed circuit board 7 disposed in the metal middle housing 1, and a metal bottom housing 3 stacked with the metal middle housing 1. The metal bottom housing 3 serves as an antenna radiation body, the printed circuit board 7 serves as a ground plate, and an antenna feed line 9 is used to connect the metal bottom housing 3 and a communications circuit module on the printed circuit board 7.

The metal middle housing 1 is electrically connected to the printed circuit board 7, and the metal middle housing 1 and the printed circuit board 7 jointly serve as a ground plate.

The metal middle housing 1 is connected to the metal bottom housing 3 using a second connecting wire 6, a slot 5 exists between the metal middle housing 1 and the metal bottom housing 3, and a slot antenna is formed by the metal middle housing 1, the metal bottom housing 3, and the slot 5 between the metal middle housing 1 and the metal bottom housing 3.

Further, the wearable device provided in this embodiment may be a watch, a wrist band, or another wearable device. The wearable devices, e.g. as in FIG. 1, all have the following structure of a circular metal middle housing 1, a display 8, and a metal bottom housing 3. The display 8 and the metal bottom housing 3 respectively seal off openings on two ends of the metal middle housing 1. The wearable device further includes the printed circuit board 7 and a battery 4 that are disposed in the metal middle housing 1.

In a specific arrangement, the wearable device further has the metal middle housing 1 that encircles the printed circuit board 7. The metal middle housing 1 is electrically connected to the printed circuit board 7, and the metal middle housing 1 and the printed circuit board 7 jointly serve as a ground plate. In a specific arrangement, the metal middle housing 1 encircles the printed circuit board 7 one round, and multiple electrical connection points exist between the metal middle housing 1 and the printed circuit board 7. The metal middle housing 1 may be connected to the printed circuit board 7 using one connection point, multiple connection points, or all of the connection points. Herein, no limitation is imposed thereto. In addition, at the electrical connection points, the metal middle housing 1 is electrically connected to the printed circuit board 7 using at least one first connecting wire 2. In this case, the metal middle housing 1 serves as an extension part of the printed circuit board 7 and participates in ground current radiation.

In the foregoing embodiment, the printed circuit board 7 may be of different shapes, for example, a circle or a square. As shown in FIG. 2, in this embodiment, the printed circuit board 7 is a circular plate. In addition, in a specific arrangement, when multiple first connecting wires 2 are used to connect the printed circuit board 7 and the metal middle housing 1, the multiple first connecting wires 2 are arranged to encircle the printed circuit board 7.

In an antenna structure, the antenna feed line 9 connects the printed circuit board 7 and the metal bottom housing 3 and feeds the metal bottom housing 3. The metal bottom housing 3 serves as an antenna radiation body. One or more electrical connection points exist between the metal middle housing 1 and the metal bottom housing 3 and serve as ground points of a PIFA in order to produce a low-frequency resonance and a high-frequency resonance. There may be one or more electrical connection points and one or more positions of the electrical connection points, and this is not limited herein.

As shown in FIG. 3, in a specific embodiment, a slot 5 further exists between a metal middle housing 1 and a metal bottom housing 3 provided in this embodiment. Further, a structure between the metal middle housing 1 and the metal bottom housing 3 includes the following. The metal middle housing 1 is connected to the metal bottom housing 3 using a second connecting wire 6, and the slot 5 exists between the metal middle housing 1 and the metal bottom housing 3. Therefore, a slot antenna is formed by the metal middle housing 1, the metal bottom housing 3, and the slot 5 between the metal middle housing 1 and the metal bottom housing 3 provided in this embodiment. In addition, the slot 5 serves as a radiation aperture. In a specific arrangement, an insulation plate 11 is disposed inside the slot 5. The insulation plate 11 is a non-metal insulation material such as a plastic pad, a rubber washer, or a ceramic wafer. In addition, a distance between a feed point and the ground point of the foregoing PIFA may be used for tuning impedance of the slot antenna. In specific use, the slot antenna provided in this embodiment functions with the PIFA in order to improve an entire radiation effect of the antenna of the wearable device.

Using the foregoing structure, the antenna provided in this embodiment of the present disclosure implements coverage of a full spectrum of LTE and frequency bands of BLUETOOTH, a wireless local area network, a communications system, and a global positioning system, and one antenna meets multiple communication functions. In addition, with a feature that an arm can improve antenna impedance, an impact of the arm on the antenna of the wearable device is reduced, and a radiation effect of the antenna is improved.

Obviously, a person skilled in the art can make various modifications and variations to the embodiments of the present disclosure without departing from the spirit and scope of the embodiments of the present disclosure. The embodiments of the present disclosure are intended to cover these modifications and variations provided that they fall within the scope of protection defined by the following claims and their equivalent technologies.

What is claimed is:
1. An antenna of a wearable device, comprising:
  a printed circuit board;
  a metal bottom housing coupled to the printed circuit board and configured to serve as an antenna radiation body;
  an antenna feed line configured to couple the metal bottom housing and a communications circuit disposed on the printed circuit board;
  a metal middle housing encircling the printed circuit board and electrically coupled to the printed circuit board, the metal middle housing and the printed circuit board being configured to jointly serve as a ground plate; and the metal middle housing being further coupled to the metal bottom housing using a first connecting wire;
  a slot existing between the metal middle housing and the metal bottom housing; and
  a slot antenna being formed by the metal middle housing, the metal bottom housing, and the slot between the metal middle housing and the metal bottom housing.

2. The antenna of claim 1, wherein the metal middle housing is electrically coupled to the printed circuit board using at least one second connecting wire.

3. The antenna of claim 2, wherein the printed circuit board comprises a circular plate.

4. The antenna of claim 1, wherein an insulation plate is disposed inside the slot.

5. The antenna of claim 1, wherein the antenna is configured to support a full spectrum of Long Term Evolution (LTE), BLUETOOTH, a wireless local area network, and a global positioning system.

6. The antenna of claim 1, wherein one electrical coupling point exists between the metal middle housing and the metal bottom housing.

7. The antenna of claim 1, wherein a plurality of electrical coupling points exists between the metal middle housing and the metal bottom housing.

8. A wearable device, comprising:
  a metal middle housing;
  a display disposed on a top of the metal middle housing;
  a printed circuit board disposed in the metal middle housing;
  a metal bottom housing stacked with the metal middle housing and configured to serve as an antenna radiation body;
  an antenna feed line configured to couple the metal bottom housing and a communications circuit disposed on the printed circuit board, the metal middle housing being electrically coupled to the printed circuit board, the metal middle housing and the printed circuit board being configured to jointly serve as a ground plate, and the metal middle housing being further coupled to the metal bottom housing using a first connecting wire; and
  a slot antenna being formed by the metal middle housing, the metal bottom housing, and a slot between the metal middle housing and the metal bottom housing.

9. The wearable device of claim 8, wherein the metal middle housing is electrically coupled to the printed circuit board using at least one second connecting wire.

10. The wearable device of claim 9, wherein the printed circuit board comprises a circular plate.

11. The wearable device of claim 8, wherein an insulation plate is disposed inside the slot.

* * * * *